April 26, 1927.
E. H. COQUILLE
SPOKED METAL WHEEL FOR MOTOR VEHICLES AND THE LIKE
Filed Dec. 9, 1922
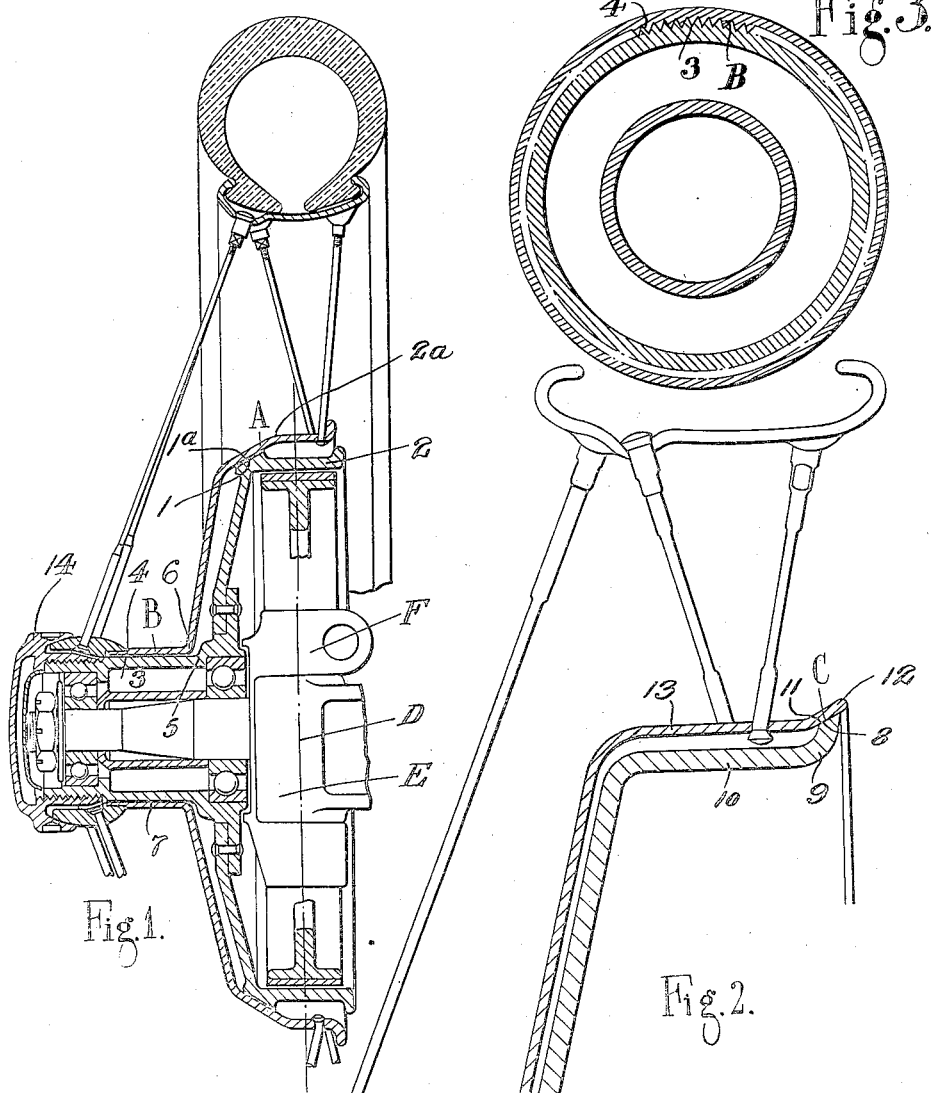
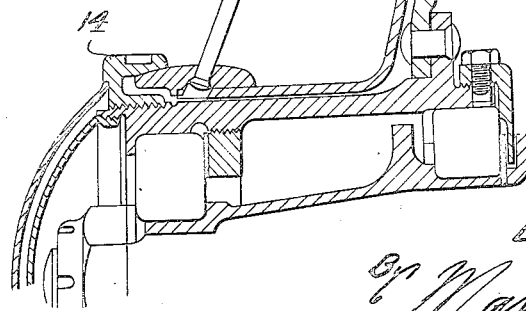
Inventor:
E. H. Coquille Patented Apr. 26, 1927.

1,625,986

UNITED STATES PATENT OFFICE.

EMILE HENRI COQUILLE, OF PARIS, FRANCE, ASSIGNOR TO RUDGE-WHITWORTH LIMITED, OF COVENTRY, WARWICK, ENGLAND.

SPOKED METAL WHEEL FOR MOTOR VEHICLES AND THE LIKE.

Application filed December 9, 1922, Serial No. 605,897, and in France December 23, 1921.

This invention relates to detachable wheels of the type having a hub formed with an intermediate step or enlargement, so that the diameter of the inner end is considerably greater than the diameter of the outer end of the hub.

In such constructions interengaging serrations for transmitting torque have been provided in the smaller diameter outer portion of the hub and a conical or like centering surface or abutment has been provided in the stepped-up or expanding part, but when the diameter of the enlarged portion greatly exceeds, say for example by some two or more times, the diameter of the smaller part and the space within the latter may be comparatively fully utilized for accommodating a brake drum, steering pivot or the like, the space available for serrations becomes restricted and the sudden application of stresses to the contacting areas, which have perhaps thus become limited for the duty to be performed, is liable to result in objectionable wear of the serrated surfaces.

The object of the present invention is to overcome such objections.

The invention consists in a detachable wheel hub of the type indicated having positive torque transmitting means in the form of interengaging serrated surfaces at a moderate radial distance from the axis of rotation, in combination with a pair of complementary coned or equivalent clutching surfaces at not less than twice the radial distance of the serrations from the axis and constituting the sole abutment for the axial force imposed by the retaining means, so that the clutching action of the cones results in a more gradual or reduced application of force to the surfaces of the serrations.

Referring now to the accompanying drawing:—

Figure 1 shows by way of example one suitable embodiment of the invention, and

Figure 2 shows a modification of the construction shown in Figure 1.

Figure 3 is a cross-section through the teeth or the like.

An advantage of the construction illustrated is that the axis D, shown in dot and dash lines, of a steering pivot in the knuckle joint E, F can be arranged to pass on extension through the point of contact of the tyre with the ground.

As shown in the embodiment illustrated by way of example in Figure 1 of the drawing, the said wheel is centered and supported at A by the co-operation of a complementary pair of conical or equivalent clutching surfaces 1 and 1ª formed upon the brake drum 2 and housing 2ª without, however, being fixed thereto by positive attachment means at this region and the contact being maintained by the axial force exerted by the locking or retaining device 14. The drive takes place through teeth 3 and 4 formed at B in the inner hub part 5 and the outer hub part 6 respectively or other positive driving means comprising readily relatively slidable complementary projections and recesses formed around the smaller projecting barrel portion 7 of the hub assisted by the frictional grip at A or C.

As shown in Figure 2, the coned or equivalent supporting and centering means is provided at C by a conical surface 8 on a flange or rib 9 standing up from that edge of the brake drum 10 which is adjacent to the vehicle, the co-operating internal surface 11 being formed just within the edge 12 of the enlarged housing portion 13. This has the advantage of excluding dirt or other foreign matter from the annular space between the interior of the housing and exterior of the brake drum 10.

In the illustrated example the wheel constructed according to this invention is mounted on a hub furnished with self-tightening locking device 14, but it is obvious that it may be adapted to all other hubs fitted with different locking devices whether these are of the automatic type or of the pawl type or comprise drums or rollers.

The cone clutch surfaces 1, 1ª and 8 and 11 are at a considerably greater radial distance from the axis of rotation that the positive engaging means 3, 4 around the barrel portion of the hub, the distance being from three to four times in the embodiment of the invention illustrated in Figures 1 and 2 of the drawings.

An important result arising from the combination of the clutch surfaces and the positive driving means is that the large diameter cone surfaces introduce a clutching action which stops any intermittent creeping backwards and forwards in a rotary sense within the limits of clearance which must be allowed to ensure relative slidability of the inner and outer hub parts. This prevention of any hammering action on the positive engaging surfaces greatly increases the life of these portions of the structure and prevents the clearance being gradually increased which would otherwise be the case as the small cone abutment surfaces usually employed will not without very excessive tightening of the retaining means prevent the before-mentioned intermittent creeping action.

Having now described my invention, what I claim as new and desire to secure by Letters Patent is:—

1. In combination in a demountable wheel hub an inner and an outer hub part, positive torque transmitting means on sleeved barrel regions of said hub parts at a moderate radial distance from the axis of rotation, means axially forcing one part upon the other and a pair of complementary conical clutching surfaces at several times said radial distance from the axis for constituting the sole axial force sustaining abutment and in so doing relieving the positive torque means from sudden force.

2. In combination in a demountable wheel hub an inner and an outer hub part, sleeved barrel regions of said hub parts not larger in diameter than necessary to accommodate the internal mechanism thereof, positive torque transmitting means on said sleeved regions axially slidable one in the other, a screw-threaded member engaging the remote end of one of said sleeved regions and contacting with the other to axially force one part upon the other and a pair of complementary conical clutching surfaces several times larger in diameter than said barrel regions for constituting the sole axial force sustaining abutment and in so doing relieving the positive torque means from sudden force.

3. In combination in a demountable wheel hub an inner and an outer hub part, positive torque transmitting means on sleeved barrel regions of said hub parts at a moderate radial distance from the axis of rotation, means axially forcing one part upon the other, drum-like enlargements one within the other springing from said barrel regions to several times said radial distance from the axis and a pair of complementary conical clutching surfaces on said drums for constituting the sole axial force sustaining abutment and in so doing relieving the positive torque means from sudden force.

4. In combination in a demountable wheel hub an inner and an outer hub part, positive torque transmitting means on sleeved barrel regions of said hub parts at a moderate radial distance from the axis of rotation, means axially forcing one part upon the other, drum-like enlargements one within the other springing from said barrel regions to several times said radial distance from the axis and a pair of complementary conical clutching surfaces at the ends of said drums away from the vehicle for constituting the sole axial force sustaining abutment and in so doing relieving the positive torque means from sudden force.

In testimony whereof I have signed my name to this specification.

EMILE HENRI COQUILLE.